Patented July 19, 1927.

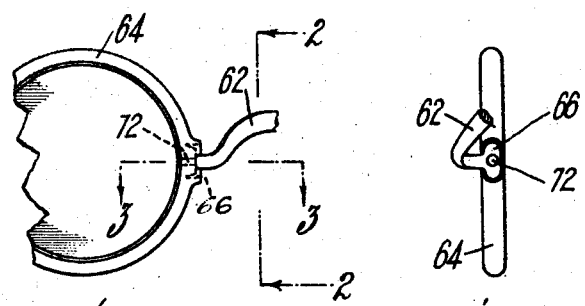
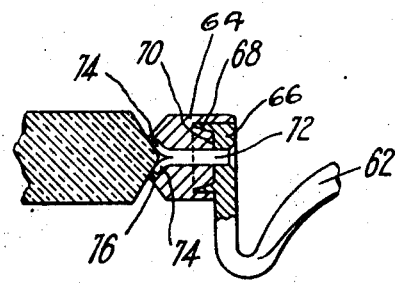
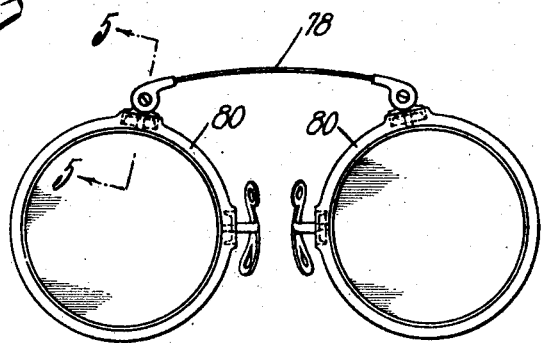
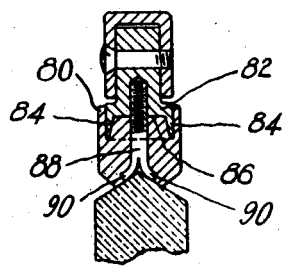

1,636,338

UNITED STATES PATENT OFFICE.

FREDERICK A. STEVENS AND JAMES W. WELSH, OF PROVIDENCE, RHODE ISLAND, ASSIGNORS, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Original application filed June 13, 1921, Serial No. 477,146. Divided and this application filed September 2, 1922. Serial No. 585,910.

This application is a division of application Serial No. 477,146, filed June 13, 1921, relating to ophthalmic mountings.

The chief object of the present invention is to provide an improved ophthalmic mounting of the non-metallic type. Other objects will appear hereinafter.

With the above objects in view, the invention consists more particularly of the improved ophthalmic mounting hereinafter described, illustrated in the accompanying drawings, and defined in the appended claims.

In the drawings, Fig. 1 is a fragmentary front elevation of an ophthalmic mounting constructed according to a preferred embodiment of the present invention; Figs. 2 and 3 are sections taken, respectively, upon the lines 2—2 and 3—3 of Fig. 1, looking in the direction of the arrows; Fig. 4 illustrates the invention applied to folding eyeglasses; and Fig. 5 is a section taken upon the line 5—5 of Fig. 4, looking in the direction of the arrows.

The invention is for illustrative purposes shown in connection with an ophthalmic mounting comprising a metal nose bridge 62 secured to a non-metallic lens rim 64. A nose-bridge terminal plate 66, having beveled walls 68, is forced into a previously formed, flat-bottomed recess 70 that is provided upon the non-metallic rim 64. A rivet or screw is employed to securely fasten the parts together. Preferably, the end of the rivet or screw 72 that lies in the lens-receiving groove 76 is previously split, and the split portions are forced apart and into the non-metallic material, as shown at 74, after the rivet is mounted in place. This method of securing the rivet or screw in place may be readily availed of, since the forced-apart portions 74 may be caused to conform to the angle of the lens-receiving groove 76. Mountings of this character may be employed either for spectacles or eyeglasses.

Another application of the invention is illustrated in Figs. 4 and 5, showing a folding bridge 78 connected to non-metallic lens rims 80. The terminal plates 82 of the bridge, having offset beveled walls 84, are forced into flat-bottomed recesses 86 of the non-metallic rims. Terminally split screws 88 are screw-threaded into the body portion of the plates 82, and their split ends 90 are then forced apart and into the non-metallic material in the same manner as described above in connection with the description of the screws 72.

Many other modifications within the spirit and scope of the invention will readily suggest themselves to persons skilled in the art. The above description is therefore intended to be illustrative and not restrictive, and it is desired that the appended claims be broadly construed, unlimited except in so far as limitations may be imposed by the prior art.

What is claimed as new is:

1. An ophthalmic mounting comprising a non-metallic member having a lens-receiving groove, a member joined to the non-metallic member, and a split metal member for joining them together, the metal member being mounted in the non-metallic member and having the split parts diverging and extending into the groove and forced into the non-metallic material of the non-metallic member at the groove to conform to the shape of the groove.

2. An ophthalmic mounting comprising a non-metallic member having a lens-receiving groove that is angular in cross section, a metal member, and an element extending through the metal member and the non-metallic member and into the lens-receiving groove to secure the metal member to the non-metallic member, an end of the element being split and the split parts being forced apart and into the non-metallic material of the non-metallic member to conform to the angle of the lens-receiving groove.

In testimony whereof, we have hereunto subscribed our names this 30th day of August, 1922.

F. A. STEVENS.
JAMES W. WELSH.